July 30, 1968   L. J. BEAUCHAINE   3,394,935
GAME
Filed Sept. 13, 1965

INVENTOR.
Lawrence J. Beauchaine
BY
Sam J. Slotsky
ATTORNEY

3,394,935
GAME
Lawrence J. Beauchaine, Box 476,
Moville, Iowa 51039
Filed Sept. 13, 1965, Ser. No. 486,857
3 Claims. (Cl. 273—130)

ABSTRACT OF THE DISCLOSURE

A game board having a recess in which puzzle pieces may be fit to form a picture and having alphabetic characters which may be covered by means on the board. A self erasing marking sheet is provided on the board for purposes of playing the game.

---

My invention relates to a game having unique and interesting characteristics.

An object of my invention is to provide a game which is interesting and amusing and can be played by persons of various ages.

A further object of my invention is to provide a game having characteristics which will test the skill of the players.

Figure 1:
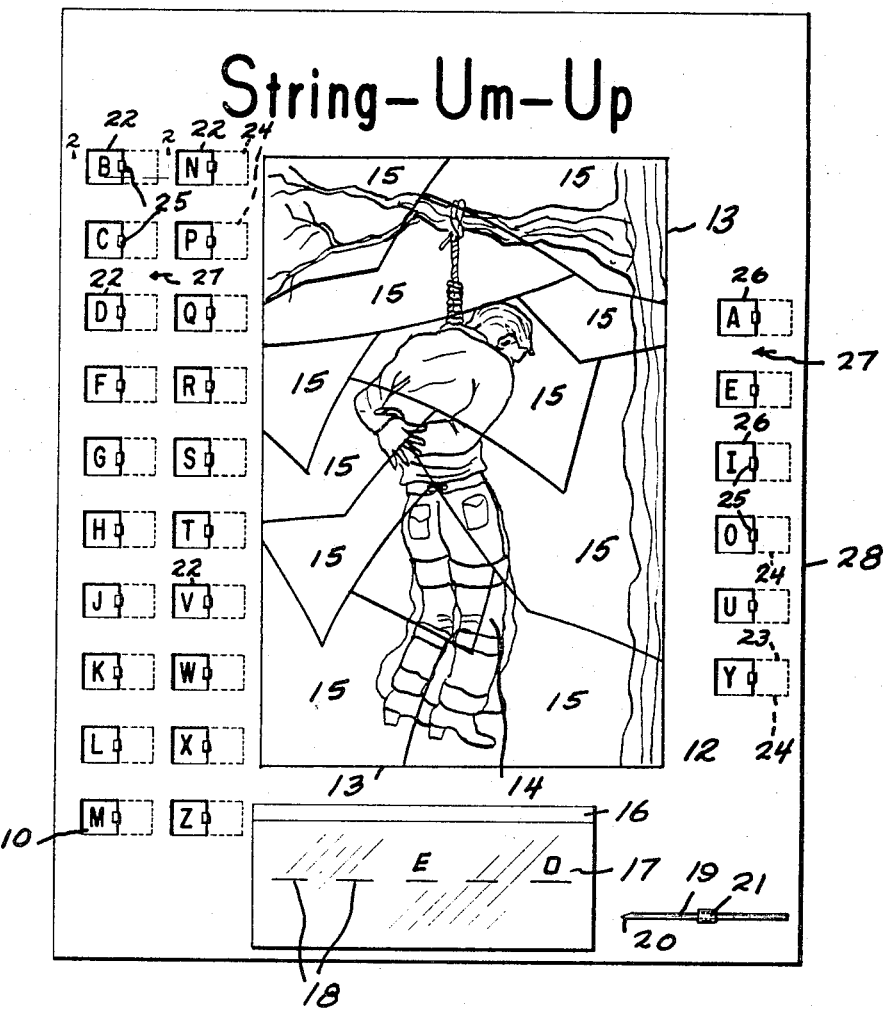
Figure 2:
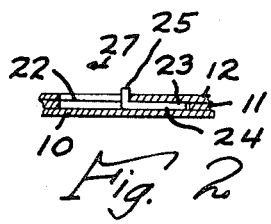

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a plan view of the game, and
FIGURE 2 is an enlarged sectional view taken along the lines 2—2 of FIGURE 1.

My invention contemplates the provision of a game board arrangement which will test the skill and knowledge of the players, and will include other characteristics as well, as will be explained.

In describing my game, I have used the character 10 to designate a base sheet, the character 11 designating an intermediate sheet, and the character 12 indicating a top sheet, these sheets being made of cardboard or other similar material.

Recessed within the sheet 12 within the rectangular cavity 13 is a drawing character 14 which is cut into the irregular various pieces 15, with the pieces being suitably engaged so as to form the complete rectangle when fitted properly together.

The character 16 indicates a marking device having a top sheet 17 of the usual type, which can be marked upon to show the various dashes or lines 18, and when the sheet 17 is raised, these dashes will disappear.

The character 19 indicating a marking stick having the pointed end 20, this stick being secured as at 21.

The character 22 indicates a series of square cavities cut in the sheets 12 and 11, and positioned adjacently to the cavities 22 and within the further cavities 23 are the tabs 24 having the upwardly bent lips 25.

Marked on the base sheet 10 and within the square cavities 22 are the various consonant letters B, C, etc. as clearly shown, and the character 26 indicates a further series of square openings cut in the sheet 12 and marked on the sheet 10. Within these particular openings are the further vowel letters A, E, etc., and adjacent to these letters are the further similar tabs 24.

The game is played in the following manner. In considering two players, A and B, A will mentally think of a word, for instance for the sake of illustration, the word "spend." A advises B that there is one vowel in the word but of course does not all all advice him of the word itself.

Next, B will name or try to guess the letters which are in the word "spend," and for instance, if he guesses the letter E, it will be marked as shown over the corresponding dash line 18, and at any time when B gives a letter, this letter will be correspondingly closed by moving the tabs 24 in the direction of the arrow 27 so that the letter will not be repeated.

If a letter is named and appears more than once in the word, it will be placed in both places at the same time.

If any of the letters called belong in the word, A will write the letter in as shown, if it does not, he will put in one of the pieces 15 of the puzzle picture 14. If A can place all of the pieces in the puzzle before his opponent B guesses the completed word, A wins the game and may choose another word and start over again. If opponent B guesses the word before the puzzle is completed, he wins and may choose the next word to be used.

The tabs 24 can be placed back in their original positions by merely tapping the board edge 28 on the table or other surface.

As stated heretofore the sheet 17 can be lifted when desired to erase the dashes 18 and the letters. The member 19 is used to mark the dashes 18 as well as the letters.

It will now be noted that I have provided the advantages mentioned in the objects of my invention, with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A board game comprising a board surface, a plurality of alphabet letters marked on said surface, a picture puzzle having removable and replaceable segments positioned on said board surface, a self erasing marking device on said board, a marker for marking on said marking device, said marker constituting means whereby a player will mark dashes on said marking device according to a pre-determined word, and whereby a further player will try to guess the letters of said word, and failing to do so said player will insert segments of said picture puzzle.

2. A board game comprising a board surface, a plurality of alphabet letters marked on said surface, a picture puzzle having removable and replaceable segments positioned on said board surface, a marking device on said board, a marker for marking on said marking device, said marker constituting means whereby a player will mark dashes on said marking device according to a pre-determined word, and whereby a further player will try to guess the letters of said word, and failing to do so said player will insert segments of said picture puzzle, means for covering said letters after being called by said further player, certain of said letters being consonants, and certain of said letters being vowels.

3. A board game comprising a board surface, a plurality of alphabet letters marked on said surface, a picture puzzle having removable and replaceable segments positioned on said board surface, a marking device on said board, a marker for marking on said marking device, said marker constituting means whereby a player will mark dashes on said marking device according to a pre-determined word, and whereby a further player will try to guess the letters of said word, and failing to do so said player will insert segments of said picture puzzle, means for covering said letters after being called by said further player, certain of said letters being consonants, and certain of said letters being vowels, said covering means including slidable tabs.

References Cited

UNITED STATES PATENTS

| | | | |
|---|---|---|---|
| 950,951 | 3/1910 | Peckham | 273—157 |
| 2,684,853 | 7/1954 | Withers | 273—135 |
| 3,185,478 | 5/1965 | McTaggart | 273—135 |

ANTON O. OECHSLE, *Primary Examiner.*